US009850990B2

(12) United States Patent
Suzuki

(10) Patent No.: US 9,850,990 B2
(45) Date of Patent: Dec. 26, 2017

(54) BELT TENSION ADJUSTING DEVICE FOR ENGINE

(71) Applicant: SUZUKI MOTOR CORPORATION, Hamamatsu-shi, Shizuoka (JP)

(72) Inventor: Ryoga Suzuki, Hamamatsu (JP)

(73) Assignee: SUZUKI MOTOR CORPORATION, Hamamatsu-Shi (JP)

(*) Notice: Subject to any disclaimer, the term of this patent is extended or adjusted under 35 U.S.C. 154(b) by 148 days.

(21) Appl. No.: 15/066,431

(22) Filed: Mar. 10, 2016

(65) Prior Publication Data
US 2016/0273624 A1 Sep. 22, 2016

(30) Foreign Application Priority Data

Mar. 20, 2015 (JP) ................................. 2015-058378

(51) Int. Cl.
F16H 7/12 (2006.01)
B60K 25/02 (2006.01)
F16H 7/08 (2006.01)

(52) U.S. Cl.
CPC ............ *F16H 7/1281* (2013.01); *B60K 25/02* (2013.01); *B60K 2025/022* (2013.01); *F16H 2007/0842* (2013.01)

(58) Field of Classification Search
CPC ........... F16H 7/1281; F16H 2007/0842; B60K 25/02; B60K 2025/022; F02B 67/06; F01L 1/022; B60H 1/3225
See application file for complete search history.

(56) References Cited

U.S. PATENT DOCUMENTS

| 5,131,889 | A  | * | 7/1992  | Meckstroth | F02B 67/06 474/117 |
| 5,780,731 | A  | * | 7/1998  | Matsui | B60H 1/3225 701/101 |
| 6,182,624 | B1 |   | 2/2001  | Ozeki | 123/90.33 |
| 7,546,824 | B2 | * | 6/2009  | Ando | F01L 1/022 123/198 E |
| 8,028,671 | B1 | * | 10/2011 | Grozich | F02B 67/06 123/195 A |

(Continued)

FOREIGN PATENT DOCUMENTS

| JP | 63-69842 U | 5/1988 |
| JP | 8-100670 A | 4/1996 |
| JP | 2000-199409 A | 7/2000 |

(Continued)

OTHER PUBLICATIONS

Japanese Office Action dated Apr. 13, 2015 issued to Japanese Application No. 2015-058378.

*Primary Examiner* — William E Dondero
*Assistant Examiner* — Robert T Reese
(74) *Attorney, Agent, or Firm* — Stein IP, LLC

(57) ABSTRACT

There is provided a belt tension adjusting device for an engine having a chain cover; a mount attaching portion; and a driving belt. An arm is swingably supported about a hinge pin fixed to the engine. A tensioner pulley is supported by the arm to be in contact with the driving belt. An auto tensioner is connected to the arm and configured to press the arm. The auto tensioner is arranged in a space, which is overlapped with the chain cover as viewed from a front side of the engine and located between the mount attaching portion and a crank pulley.

5 Claims, 5 Drawing Sheets

(56) References Cited

U.S. PATENT DOCUMENTS

| | | | | |
|---|---|---|---|---|
| 2011/0065539 A1* | 3/2011 | Robbins | ................ | F16H 7/1281 474/135 |
| 2012/0178563 A1* | 7/2012 | Lee | ...................... | F16H 7/1281 474/110 |

FOREIGN PATENT DOCUMENTS

| | | | |
|---|---|---|---|
| JP | 2005-214121 A | 8/2005 | |
| JP | 2009-144726 A | 7/2009 | |
| JP | 2011-17393 A | 1/2011 | |

\* cited by examiner

UP
LEFT
(EXHAUST SIDE)

UP
LEFT
(EXHAUST SIDE)

BELT TENSION ADJUSTING DEVICE FOR ENGINE

CROSS-REFERENCE TO RELATED APPLICATIONS

The disclosure of Japanese Patent Application No. 2015-058378 filed on Mar. 20, 2015, including specification, drawings and claims is incorporated herein by reference in its entirety.

TECHNICAL FIELD

The present invention relates to a belt tension adjusting device for adjusting tension of a driving belt for transmitting a power between a crank pulley of a crankshaft of an engine and accessory pulleys of accessories.

BACKGROUND

There is a technique of transmitting a power between a crankshaft and accessories by a driving belt wound around an engine crank pulley and accessory pulleys. For example, Patent Document 1 discloses such a technique of transmitting a power between a crankshaft and accessories by a driving belt wound around accessory pulleys and a crank pulley.

In Patent Document 1, mount brackets for fixing an engine to a vehicle body are bolted and fixed to an engine body via attaching portions in such a manner that mount brackets straddle on both sides of a cylinder head and a cylinder block.

Also, in the engine disclosed in Patent Document 1, a belt tensioner is disclosed in which one end of a spring damper unit is swingably fixed to a crank case via a shaft, the center of an arm portion is swingably fixed to an AC generator support portion of a cylinder block via a pivot portion, the other end of the spring damper unit and one end of the arm portion are pivotally connected to each other via a shaft, and also the other end of the arm portion is rotatably supported by a shaft. Also, due to a stretching force by a spring of the spring damper unit, the tensioner pulley is always pressed against a belt via the arm portion.

Patent Document 1: Japanese Patent Application Publication No. H08-100670A

In the engine disclosed in Patent Document 1, the one end of the spring damper unit is arranged outside a front cover. Namely, because the spring damper unit protrudes outward in a width direction of the front cover, a dimension of the engine in the width direction is increased and thus an engine mount space is also increased.

SUMMARY

It is an object of the present invention to provide a belt tension adjusting device of an engine, in which even in a case of an engine, in which a mount attaching portion configured to attach thereto a mount bracket for fixing an engine body is provided so as to protrude forward from a chain cover for covering a timing chain, an auto tensioner configured to press an arm supporting a tensioner pulley in contact with a driving belt can be arranged while effectively utilizing a space below the mount attaching portion, thereby achieving a compacted dimension of the engine.

According to an aspect of the embodiments of the present invention, there is provided a belt tension adjusting device for an engine having a chain cover provided on a front side of an engine body; a mount attaching portion provided so as to protrude forward from the chain cover and configured to attach thereto a mount bracket for fixing the engine body; and a driving belt wound around a crank pulley fixed to a crankshaft and configured to transmit a power between the crankshaft and at least one accessory, the belt tension adjusting device comprising: an arm swingably supported about a hinge pin fixed to the engine; a tensioner pulley supported by the arm to be in contact with the driving belt; and an auto tensioner connected to the arm and configured to press the arm, wherein the auto tensioner is arranged in a space, which is overlapped with the chain cover as viewed from the front side of the engine and located between the mount attaching portion and the crank pulley.

By applying the belt tension adjusting device according to the above configuration to an engine, a belt tension adjusting device of the engine can be provided, in which even in a case of an engine, in which a mount attaching portion for attaching thereto a mount bracket for fixing an engine body is provided so as to protrude forward from a chain cover for covering a timing chain, an auto tensioner configured to press an arm supporting a tensioner pulley in contact with a driving belt can be arranged while effectively utilizing a space below the mount attaching portion, thereby achieving a compacted dimension of the engine.

DETAILED DESCRIPTION OF THE EMBODIMENTS

Hereinafter, details of a structure of an embodiment of the present invention will be described on the basis of the accompanying drawing. Meanwhile, although an example where an engine belt tension adjusting device of the present invention is applied to a four-wheeled vehicle will be described below, the present invention is not limited to that and accordingly can be appropriately modified. For example, the engine belt tension adjusting device of the present invention may be applied to engines of automatic two-wheeled vehicles, snowmobiles, ships, electric generators and the like.

Now, a schematic configuration of an engine according to the present embodiment will be described with reference to FIGS. 1 and 2.

Meanwhile, a direction which is parallel to a rotational axis C of a crankshaft of the engine and is oriented from a cylinder block 2 toward a chain cover 6 is referred to as a front direction, a direction which is perpendicular to a joint surface P between a cylinder head 4 and the cylinder block 2 of the engine and is oriented from the cylinder block 2 toward the cylinder head 4 is referred to as an upward direction, a direction which is parallel to the joint surface P between the cylinder head 4 and the cylinder block 2 is referred to as an intake and exhaust direction, and a direction which is oriented from an intake side toward an exhaust side is referred to as a left direction. Unless otherwise mentioned, the following description will be based on the above directions.

Figure 1:
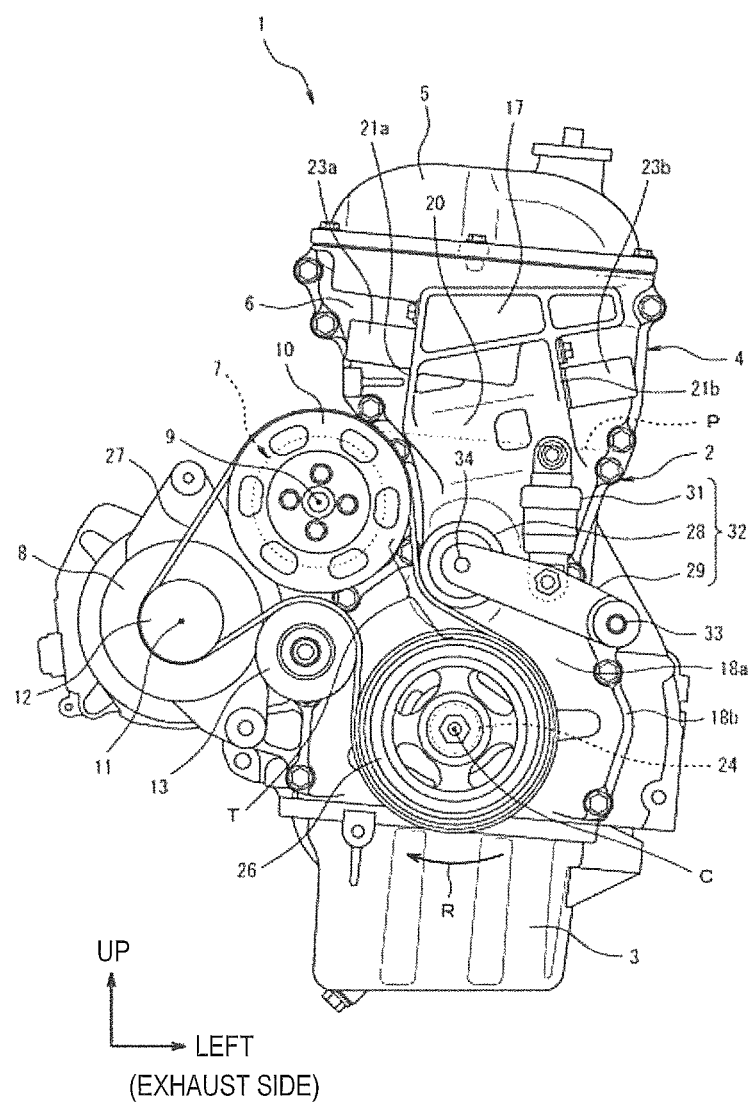
FIG. 1 is a view showing an engine according to an embodiment of the present invention, as viewed from the front side of the engine.

FIG. 1 is a view showing a DOHC 4-valve inline 4-cylinder automotive gasoline engine, which is the engine of the present embodiment of the present invention, as viewed form the front side thereof. Also, FIG. 2 is a view showing a front portion of the engine according to the embodiment of the present invention, as viewed obliquely from above.

Figure 2:
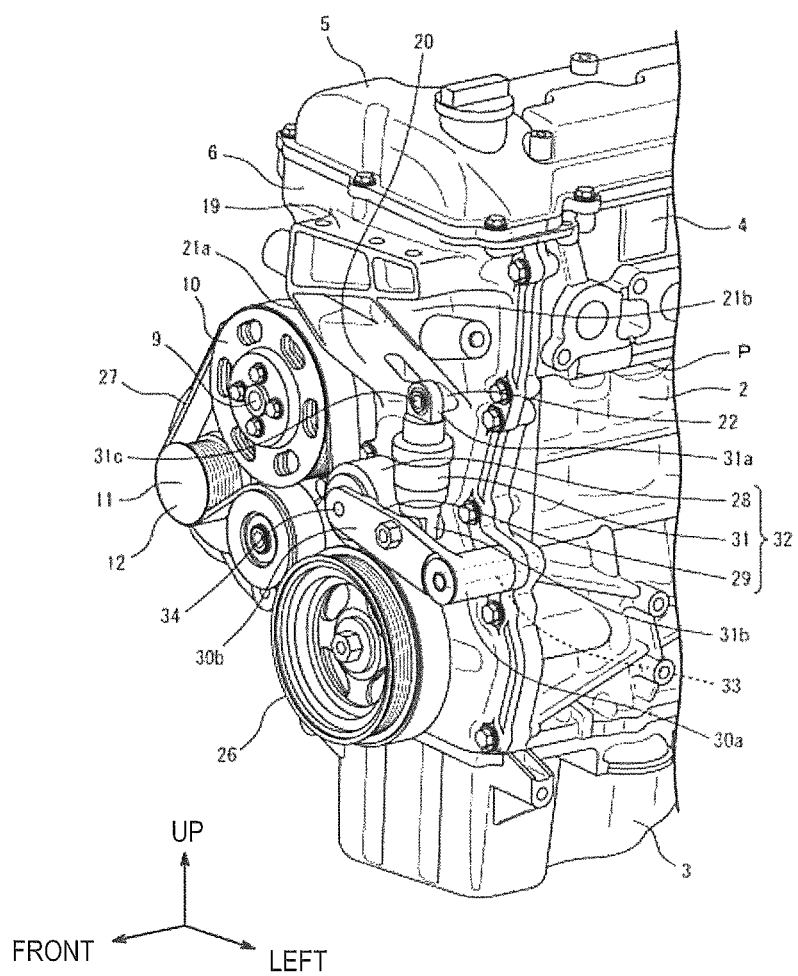
FIG. 2 is a view showing a front portion of the engine according to the embodiment of the present invention, as viewed obliquely from above.

As shown in FIGS. 1 and 2, an engine body 1 of the engine according to the present embodiment includes a cylinder block 2, an oil pan 3 arranged below the cylinder block 2, a cylinder head 4 arranged above the cylinder block 2 and configured to suck air through an intake port (not shown) and then discharge combustion gas through an exhaust port 4a, and a cylinder head cover 5 arranged to cover an upper portion of the cylinder head 4.

On front end surfaces of the cylinder block 2 and the cylinder head 4, a chain cover 6 covering a timing chain, not shown, from the front, is attached so that upper and lower end surfaces thereof are sandwiched between the cylinder head cover 5 and the oil pan 3.

A water pump 7 for circulating cooling water through the inside of the engine body 1 is fixed to an upper portion of an intake-side surface of the cylinder block 2. On a lower portion of the intake-side surface of the cylinder block 2, a motor/generator 8 serving as both of an electric generator for generating an electric power required in a vehicle and an electric motor for generating a driving power is fixed to the intake side of the cylinder block 2.

The water pump 7 has an input shaft 9 extending in a front and rear direction, and a water pump pulley 10 is bolted and connected to a distal end of the input shaft 9 to be integrally rotatable with the input shaft 9.

The motor/generator 8 has an input/output shaft 11 extending in a front and rear direction, and a motor/generator pulley 12 is arranged on a distal end of the input/output shaft 11 to be integrally rotatable with the input/output shaft 11.

An idler pulley 13 is arranged below the water pump pulley 10 on the intake-side surface of the cylinder block 2.

Figure 3:
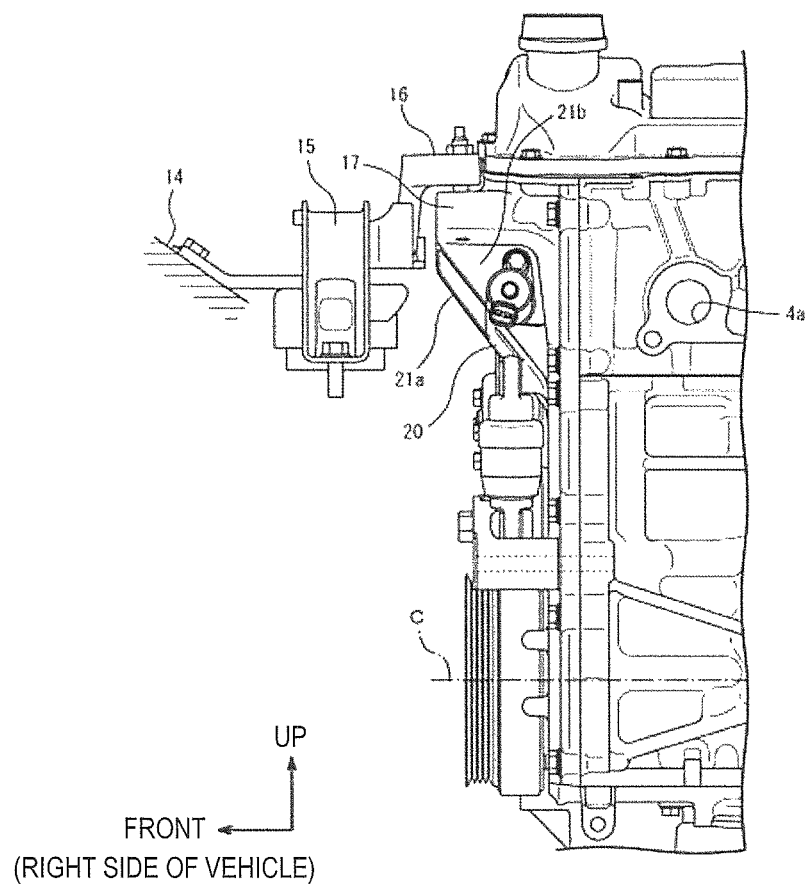
FIG. 3 is a view showing a state where the engine according to the embodiment of the present invention is attached on a vehicle body, as viewed from an exhaust side thereof.

As shown in FIG. 3, a mount device 15 for supporting the engine body 1 on a vehicle body 14 is provided. The mount device 15 is connected with one end of a mount bracket 16, and the other end of the mount bracket 16 is bolted and fixed to a mount attaching portion 17 provided on the chain cover 6. The engine body 1 is horizontally mounted inside an engine room in such a state that the front portion thereof is oriented toward a right side of the vehicle.

The mount attaching portion 17 is formed on the upper portion of the chain cover 6 to protrude forward from a wall portion 18a of the chain cover 6 as described below. The mount attaching portion 17 includes an attaching seat 19 formed on the upper portion of the chain cover 6 and having a flat surface, on which the mount bracket 16 is attached, an inclined surface 20 connecting the attaching seat 19 with the wall portion 18a of the chain cover 6 and extending downward beyond a joint surface P between the cylinder block 2 and the cylinder head 4, and a pair of upright walls 21a and 21b formed on both sides of the inclined surface 20 in the intake and exhaust direction and connecting the attaching seat 19 with the wall portion 18a of the chain cover 6. The upright walls 21a and 21b are spaced from each other in the intake and exhaust direction and are formed in a generally triangular shape as viewed in the intake and exhaust direction. The inclined surface 20 of the mount attaching portion 17 is formed so as to extend in a left upward direction with respect to the intake and exhaust direction. A boss portion 22, to which an upper end 31a of an auto tensioner 31 as described below is connected, is formed below the mount attaching portion 17 to protrude from the wall portion 18a. In this way, the mount attaching portion 17 is formed so as to be connected to the wall portion 18a by the inclined surface 20 and upright walls 21a and 21b and also to have a size occupying the majority of an upper half of the chain cover 6, thereby ensuring an increased rigidity. Thus, the mount attaching portion 17 can bear a weight of the engine to support the engine and also a deformation thereof due to vibrations during operation of the engine can be reduced. Also, the boss portion 22 is formed on the chain cover 6, and thus even if a reaction force to a force pressing the driving belt 27 against the auto tensioner 31 is exerted thereon, a deformation such as collapse can be inhibited, thereby achieving a strong fixation of the auto tensioner 31.

Oil control valves 23a and 23b are provided on a part of the mount attaching portion 17 which is located below the attaching seat 19. The oil control valves 23a and 23b are configured to control an oil pressure in a variable valve timing device for controlling valve timing. The oil control valves 23a and 23b have a main part formed in a cylindrical shape and are inserted from outside into the inside of the chain cover 6 to be respectively fixed to the upright walls 21a and 21b. The oil control valve 23b on the exhaust side is provided to be parallel to the inclined surface 20 in such a manner that an attaching direction thereof is inclined upward relative to the intake and exhaust direction. Because the oil control valves 23a and 23b are inserted in the mount attaching portion 17, a lower end of the inclined surface 20 of the mount attaching portion 17 is arranged at a position lowered by a dimension of the oil control valves 23a and 23b in the upward and downward direction. Thus, the space S is reduced in the upward and downward direction, as compared with a case where the oil control valves 23a and 23b are not provided on the mount attaching portion 17.

During operation of the engine, the crankshaft 24 is rotatably driven about the rotational axis C of the crankshaft in a clockwise direction as viewed from the front side. Also, the crankshaft 24 is provided with a distal end extending through an opening 25 formed in the chain cover 6 and then protruding to the front of the chain cover 6. A crank pulley 26 is bolted and connected to the distal end of the crankshaft 24 to be integrally rotatable with the crankshaft 24.

Figure 5:
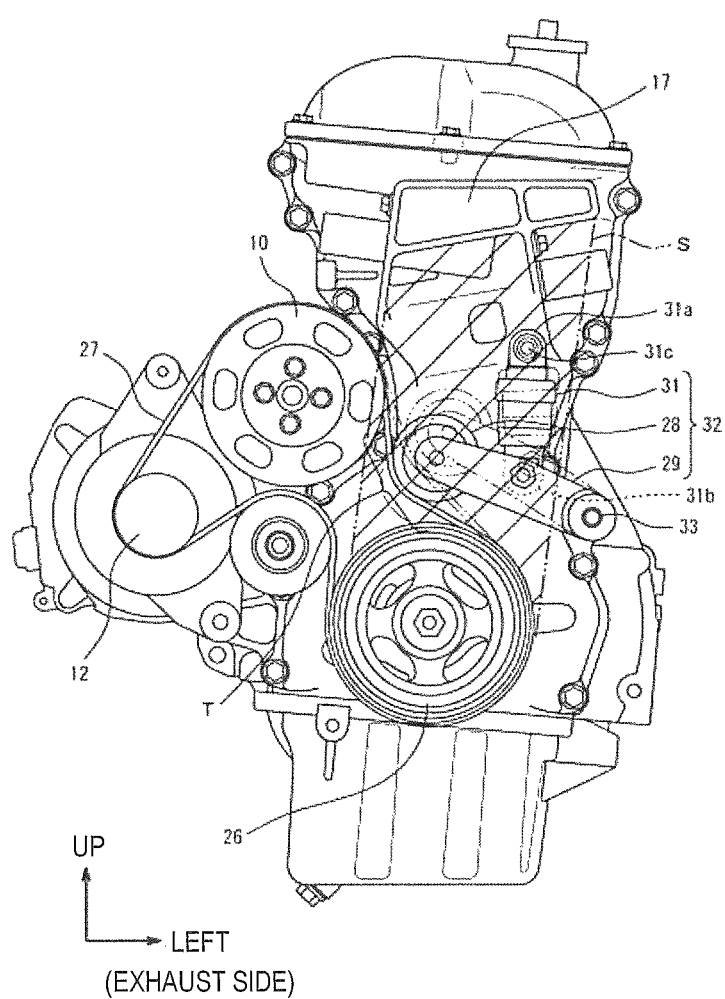
FIG. 5 is a view showing a state where a belt tension adjusting device is swung in the engine according to the embodiment of the present invention.

A space S is formed in a region which is overlapped with the chain cover 6 as viewed from the front side of the engine body 1 and located between the mount attaching portion 17 and the crank pulley 26 (see FIG. 5). As described above, because the inclined surface 20 is formed so as to extend in the left upward direction with respect to the intake and exhaust direction, the space S is formed so as to be widened in an upward and downward direction as it goes from the rotation center of the crank pulley 26 toward the left side.

In order to transmit a driving power of the crankshaft 24 to the water pump 7 and the motor/generator 8 or transmit a driving power of the motor/generator 8 to the crankshaft 24 and the water pump 7, one endless driving belt 27 is wound around the crank pulley 26, the water pump pulley 10, the motor/generator pulley 12 and the idler pulley 13. The motor/generator 8 and the water pump 7 both are provided on the intake side of the engine body 1. Namely, the water pump pulley 10, the motor/generator pulley 12 and the idler pulley 13 are arranged to be offset toward the intake side in the intake and exhaust direction relative to the rotational axis C of the crankshaft, so that the majority of an arrangement layout of the driving belt can be arranged on the intake side relative to the rotational axis C. Thus, a space in which a tensioner pulley 28, an arm 29, an auto tensioner 31 and the like as described below are arranged can ensured on the exhaust side relative to the rotational axis C in the chain cover 6.

During operation of the engine, the crankshaft 24 is a driving shaft and thus travels the driving belt 27 in a clockwise direction R (shown) in FIG. 1 to rotate the input/output shaft 11 of the motor/generator 8 and the like, which is a driven shaft, thereby generating electricity.

On the other hand, upon starting of the engine, the input/output shaft 11 of the motor/generator 8 is a driving shaft and thus travels the driving belt 27 in the clockwise direction R (shown) in FIG. 1 to rotate the crankshaft 24, which is a driven shaft, thereby performing cranking.

For the driving belt 27, for example, a stretchable elastic resin material is used. As the driving belt 27, a V-ribbed belt provided with a plurality of ribs having a generally triangular cross section and extending in a longitudinal direction of the belt is used.

The crank pulley 26, the water pump pulley 10 and the motor/generator pulley 12 have grooves coming in contact with ribs of the driving belt 27. Due to friction, which is created by the driving belt 27 pressed against the grooves of each pulley, rotation of the crank pulley 26 is transmitted to the water pump pulley 10 and the motor/generator pulley 12 via the driving belt 27.

As a tension adjusting mechanism of the driving belt 27 for obtaining tension required in the friction transmission as described above, the engine according to the embodiment of the present invention is provided with a belt tensioner 32 constituted of a tensioner pulley 28, an arm 29 and an auto tensioner 31. The belt tensioner 32 is arranged above the crank pulley 26 and below the mount attaching portion 17 as viewed from the front side.

The arm 29 is swingably supported by the cylinder block 2 at one end thereof, and the tensioner pulley 28 is rotatably supported by the other end of the arm 29. The tensioner pulley 28 is arranged to come in contact with the driving belt 27 in a range thereof corresponding to a span T, which becomes a loosened side relative to the crank pulley 26 upon craning by the motor/generator 8. Also, the idler pulley 13 is arranged in a range of the driving belt 27, which becomes a loosened side relative to the crank pulley 26 during operation of the engine. Because a back surface of the driving pulley 27 is always pressed by the tensioner pulley 28 and the idler pulley 13, looseness due to reduction in tension of the driving belt 27 is inhibited and thus a slip between the driving belt 27 and each pulley is prevented. The tensioner pulley 28 is arranged in the space S. Also, as shown in FIG. 3, the tensioner pulley 28 is arranged below the mount attaching portion 17 and also rear side relative to the front end of the mount attaching portion 17 as well as in front of the chain cover 6.

The arm 29 is constituted of a cylindrical portion 30*a* formed on a base end thereof and a plate-shaped portion 30*b* oriented from an end of the cylindrical portion 30*a* outward in a radial direction of the cylindrical portion 30*a* and having a flat plate extending like an arm. A hinge pin 33, which extends through the chain cover 6 and thus is fixed to the cylinder block 2 at an end thereof, is fitted in an inner circumference of the cylindrical portion 30*a* to swingably support the aim 29. The plate-shaped portion 30*b* on a distal end of the arm 29 is provided with a support pin 34 for rotatably support the tensioner pulley 28. The arm 29 extends generally in the intake and exhaust direction, as viewed from the front side of the engine, to intersect a side edge portion 18*b* of the exhaust side of the chain cover 6, and a base end thereof is provided in a recessed region of the chain cover 6, which is formed so as to be recessed toward the intake side in the intake and exhaust direction.

For the purpose of preventing a slip between the crank pulley 26 or accessory pulleys 10 and 12 and the driving belt 27 when transmitting power between the crankshaft 24 and the water pump 7 and motor/generator 8, which are accessories, by the driving belt 27, the auto tensioner 31 is provided to so as to add tension to the driving belt 27.

The auto tensioner 31 has a cylindrical damper stretchable in an axial direction thereof and a spring (not shown) provided therein and creates a pressing force in the axial direction. The auto tensioner 31 is configured so that an upper end 31*a* and a lower end 31*b* thereof are respectively swingably connected to the boss portion 22, which is formed above the joint surface P and below the mount attaching portion 17, and the middle portion of the plate-shaped portion 30*b* of the arm 29. Thus, the auto tensioner 31 is connected to bridge between the mount attaching portion 17 and the arm 29. Due to the pressing force by the auto tensioner 31, the driving belt 27 is urged by the tensioner pulley 28 in a tension increase direction. The auto tensioner 31 is arranged in the space S. Also, as shown in FIG. 3, the auto tensioner 31 is arranged below the mount attaching portion 17 and also rear side relative to the front end of the mount attaching portion 17 as well as in front of the chain cover 6. In addition, the auto tensioner 31 is provided on the exhaust side relative to the rotation center position of the crank pulley 26 and thus can be provided in a region of the space S, which is widened in the upward and downward direction as it goes from the rotation center position of the crank pulley 26 toward the left side as described above. Because the auto tensioner 31 is configured so that the upper end 31*a* is arranged above the joint surface P between the cylinder head 4 and the cylinder block 2, an available sufficient space can be provided below thereof.

Figure 4:
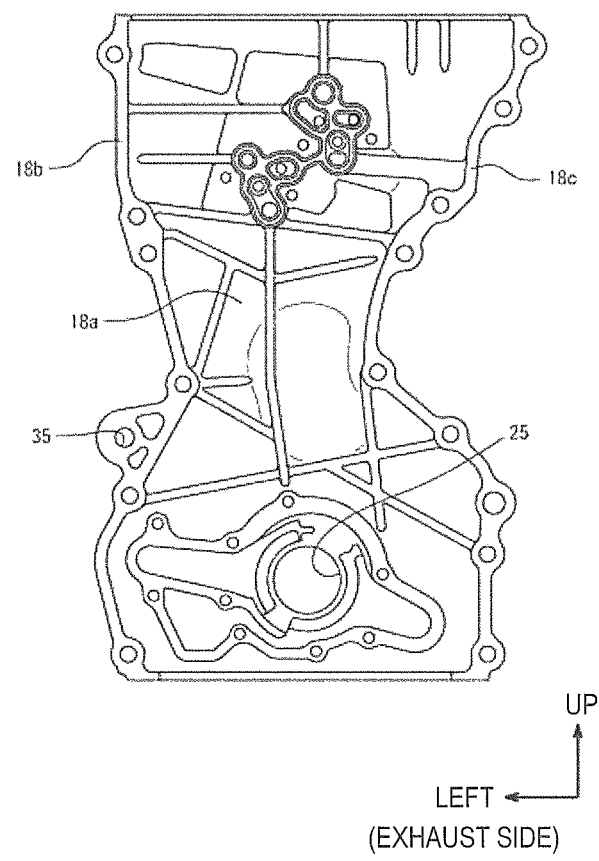
FIG. 4 is a view showing a unitary chain cover of the engine according to the embodiment of the present invention, as viewed from rear side thereof.

As shown in FIG. 4, the chain cover 6 mainly includes a pair of side edge portions 18*b* and 18*c* spaced from each other in a width direction thereof and the wall portion 18*a* connecting the side edge portions 18*b* and 18*c*. The side edge portion 18*b* at the exhaust side has a through-holed boss, of which an inner circumference defines a through-hole 35 configured to pass the hinge pin 33 therethrough, formed so as to protrude toward the exhaust side relative to the side edge portions 18*b* and 18*c*. The through-holed boss is provided on a narrow part of the chain cover 6, at which the side edge portion 18*c* and the side edge portion 18*b* are close to each other by approaching each other in opposing directions. Because the through-holed boss is provided on the narrow part, i.e., the recessed region of the chain cover 6, which is formed so as to be recessed toward the intake side in the intake and exhaust direction, the width of the chain cover 6 in the intake and exhaust direction is not increased due to installation of the through-holed boss.

The tensioner pulley 28 and the part of the arm 29, which is located at a side of the distal end rather than the base end, as well as the auto tensioner 31, are intensively arranged inside the space S. By intensively arranging the components, the space below the mount attaching portion 17 may be effectively utilized. In addition, because the base end of the arm 29 is provided in the recessed region of the chain cover 6, which is formed so as to be recessed toward the intake side in the intake and exhaust direction, the base end does not protrude in the width direction of the chain cover 6. In addition, because the base end does not excessively protrude from the recessed region in the intake and exhaust direction even if at least a part of the base end, not the whole thereof, is provided in the recessed region, a dimension of the engine in the intake and exhaust direction can be compacted. Due to this configuration, the belt tensioner 32 constituted of the auto tensioner 31, the tensioner pulley 28 and the arm 29 can be compactly arranged below the mount attaching portion 17 without increasing the dimension of the engine in the intake and exhaust direction.

Also, as shown in FIG. 3, the tensioner pulley 28, the auto tensioner 31 and the arm 29 are arranged below the mount attaching portion 17, at a rear side relative to a front end of the mount attaching portion 17 and in front of the chain cover 6. Because the components are intensively arranged in the space below the mount attaching portion 17, the components can be compactly arranged in the front and rear direction without protruding relative to the front end of the mount attaching portion 17 in the front and rear direction.

Next, Operation of the belt tensioner 32 together with movement of each component of the belt tensioner 32 will be described with reference to FIG. 5.

In the belt tensioner 32 configured as described above, the driving belt 27 in the range of the span T is loosened or tightened due to a fluctuation in load of the accessories such as the water pump pulley 10 or the motor/generator pulley 12 or a fluctuation in tension of the driving belt 27 in accordance with a change in angular velocity of the crankshaft 24. As the driving belt 27 in the span T is loosened or tightened, the arm 29 is swung about the hinge pin 33. When the driving belt 27 in the span T is tightened, the arm 29 is swung about the hinge pin 33 in the clockwise direction, whereas when the driving belt 27 in the span T is loosened, the arm 29 is swung about the hinge pin 33 in a counterclockwise direction.

As the arm 29 is swung, the auto tensioner 31 in association with the arm 29 is swung about a support portion 31c of the upper end 31a. For example, when the driving belt 27 in the span T is tightened, the auto tensioner 31 is swung about the support portion 31c in the counterclockwise direction and thus the lower end 31b are displaced to approach the side edge portions 18b and 18c located on the exhaust side of the chain cover 6 in the width direction.

Even if the auto tensioner 31 is swung, the auto tensioner 31 is configured to be swung within the space S, which is overlapped with the chain cover 6 as viewed from the front side of the engine body 1 and located between the mount attaching portion 17 and the crank pulley 26. Also, in a case where accessories such as the motor/generator 8 is attached on the engine body and thus a large driving torque is required, the fluctuation in tension of the driving belt is increased when driving the accessories with the driving belt 27. However, even in this case, the auto tensioner 31 is swung within the space S located between the mount attaching portion 17 and the crank pulley 26.

Herein, in the engine according to the present embodiment, the auto tensioner 31 is arranged in the space S, which is overlapped with the chain cover 6 as viewed from the front side of the engine and located between the mount attaching portion 17 and the crank pulley 26.

Due to these configurations, even in the case of the engine, which has the mount attaching portion 17 provided on the chain cover 6, the auto tensioner 31 can be arranged while effectively utilizing the space below the mount attaching portion 17. Accordingly, the auto tensioner 31 can be arranged within the inside of the chain cover 6 in the width direction. As a result, the engine can be configured to have a compacted dimension.

Also, in the engine according to the present embodiment, the chain cover 6 has the pair of side edge portions 18b and 18c spaced from each other in a width direction thereof and the wall portion 18a connecting the side edge portions 18b and 18c, and the mount attaching portion 17 is formed with the inclined surface 20 connecting a lower part thereof with the wall portion 18a, and the inclined surface 20 is provided with the boss portion 22 protruding forward. In addition, the auto tensioner 31 is connected to the boss portion 22 so that the upper end 31a is overlapped with the inclined surface 20 as viewed from the front side of the engine.

Due to these configurations, the auto tensioner 31 can be arranged within the inside of the chain cover 6 in the width direction so that the engine can be configured to have a compacted dimension, and additionally, the auto tensioner 31 can be connected to the boss portion 22 attached on the mount attaching portion 17 having a large rigidity so that even if a reaction force to a force pressing the driving belt 27 against the auto tensioner 31 is exerted thereon, a deformation such as collapse can be inhibited, thereby achieving a strong fixation of the auto tensioner 31.

Further, in the engine according to the present embodiment, the oil control valves 23a and 23b, which are configured to control an oil pressure in a variable valve timing device for controlling valve timing, are provided on a lower part of the mount attaching portion 17 such that the oil control valves 23a and 23b are inserted and fixed to the chain cover 6 from outside toward inside thereof.

Due to these configurations, the space below the mount attaching portion 17 can be effectively utilized, and as a result, even if the oil control valves 23a and 23b are inserted in the mount attaching portion 17 and thus a lower end of the inclined surface 20 of the mount attaching portion 17 is arranged at a position lowered by a dimension of the oil control valves 23a and 23b in the upward and downward direction, the oil control valves 23a and 23b and the auto tensioner 31 are arranged on top of one another.

Further, in the engine according to the present embodiment, the motor/generator 8 serving as both of an electric generator for generating an electric power and an electric motor for generating a driving power, and the water pump 7 for circulating cooling water through the inside of the engine are provided, and both the motor/generator 8 and the water pump 7 are arranged on one of intake and exhaust sides relative to the engine body 1.

Due to these configurations, the water pump pulley 10, the motor/generator pulley 12 and the idler pulley 13 are arranged to be offset toward the intake side in the intake and exhaust direction relative to the rotational axis C of the crankshaft, so that the majority of an arrangement layout of the driving belt 27 can be arranged on the intake side relative to the rotational axis C. Thus, a space in which the tensioner pulley 28, the arm 29, the auto tensioner 31 and the like are arranged can ensured on the front side of the chain cover 6.

Further, in the engine according to the present embodiment, the tensioner pulley, the auto tensioner and the part of the arm, which is located at a side of the distal end rather than the base end, are arranged in the space which is overlapped with the chain cover as viewed from the front side of the engine body and located between the mount attaching portion and the crank pulley, and the base end of the arm is provided in the recessed region of the chain cover 6, which is formed so as to be recessed toward one side in the intake and exhaust direction.

Due to these configurations, the base end does not excessively protrude from the recessed region in the intake and exhaust direction a dimension of the engine in the intake and exhaust direction can be compacted. Accordingly, the belt tensioner 32 constituted of the auto tensioner 31, the tensioner pulley 28 and the arm 29 can be compactly arranged below the mount attaching portion 17 without increasing the dimension of the engine in the intake and exhaust direction.

Further, in the engine according to the present embodiment, the tensioner pulley 28, the auto tensioner 31 and the arm 29 are arranged below the mount attaching portion 17, at a rear side relative to the front end of the mount attaching portion 17 and in front of the chain cover 6.

Due to these configurations, the components of the belt tensioner 32 can be compactly arranged without protruding relative to the front end of the mount attaching portion 17 in the front and rear direction, thereby achieving a compacted dimension of the engine in the front and rear direction.

Although structures of the embodiments of the present invention have been described above, the present invention is not limited to the foregoing embodiments, but can be variously modified and applied. For example, although in the embodiments of the present invention, the water pump pulley and the motor/generator pulley are provided as accessories to be driven by the driving belt, the present invention can be applied to various other accessories so long as a driving power of the crankshaft can be transmitted to the accessories via the driving belt, and accordingly, accessories to be driven by the driving belt according to the present invention may include a generator, which serves as only an electric generator and thus does not have a function of generating a driving power, a power steering pump, an air conditioner compressor and the like. Also, although in the foregoing embodiments of the present invention, the DOHC 4-valve inline 4-cylinder automotive gasoline engine has been employed, the present invention can be applied to internal combustion engines of automatic two-wheeled vehicles, snowmobiles, ships, electric generators and the like, regardless of whether the engines are gasoline engines or diesel engines. Further, the number of cylinders is not limited to four cylinders, and accordingly, the present invention can be applied to engines having a single cylinder, or two, three, five or more cylinders. In addition, with respect to a cylinder array, the present invention is not limited to the inline type and thus can be applied to engines having various cylinder arrays, such as V-type engines and horizontally opposed engines. In addition, detailed configuration, arrangement, number and the like of each device or each member can be appropriately modified, added or selected without departing from the scope and spirit of the present invention.

What is claimed is:

1. A belt tension adjusting device for an engine having a chain cover provided on a front side of an engine body; a mount attaching portion provided so as to protrude forward from the chain cover and configured to attach thereto a mount bracket for fixing the engine body; and a driving belt wound around a crank pulley fixed to a crankshaft and configured to transmit a power between the crankshaft and at least one accessory, the belt tension adjusting device comprising:
    an arm swingably supported about a hinge pin fixed to the engine;
    a tensioner pulley supported by the arm to be in contact with the driving belt; and
    an auto tensioner connected to the aim and configured to press the arm,
    wherein the auto tensioner is arranged in a space, which is overlapped with the chain cover as viewed from the front side of the engine and located between the mount attaching portion and crank pulley; wherein the chain cover has a pair of side edge portions spaced from each other in a width direction thereof and a wall portion connecting the side edge portions, wherein the mount attaching portion is formed with an inclined surface connecting a lower part thereof with the wall portion, wherein the inclined surface is provided with a boss portion protruding forward, and wherein the auto tensioner is connected to the boss portion so that an upper end thereof is overlapped with the inclined surface as viewed from the front side of the engine.

2. The belt tension adjusting device for the engine according to claim 1, wherein oil control valves for controlling an oil pressure in a variable valve timing device for controlling valve timing, are provided on a lower part of the mount attaching portion such that the oil control valves are inserted and fixed to the chain cover from outside toward inside thereof.

3. The belt tension adjusting device for the engine according to claim 1,
    wherein the accessory comprises a motor/generator serving as both of an electric generator for generating an electric power and an electric motor for generating a driving power, and a water pump for circulating cooling water through the inside of the engine,
    wherein both the motor/generator and the water pump are arranged on one of intake and exhaust sides relative to the engine body.

4. The belt tension adjusting device for the engine according to claim 1,
    wherein the tensioner pulley, the auto tensioner and a part of the arm, which is located at a side of a distal end thereof rather than a base end, are arranged in the space which is overlapped with the chain cover as viewed from the front side of the engine body and located between the mount attaching portion and the crank pulley, and
    wherein the base end of the arm is provided in a recessed region of the chain cover, which is formed so as to be recessed toward one side in an intake and exhaust direction.

5. A belt tension adjusting device for an engine having a chain cover provided on a front side of an engine body; a mount attaching portion provided so as to protrude forward from the chain cover and configured to attach thereto a mount bracket for fixing the engine body; and a driving belt wound around a crank pulley fixed to a crankshaft and configured to transmit a power between the crankshaft and at least one accessory, the belt tension adjusting device comprising:
    an arm swingably supported about a hinge pin fixed to the engine;
    a tensioner pulley supported by the arm to be in contact with the driving belt; and
    an auto tensioner connected to the arm and configured to press the arm,
    wherein the tensioner pulley, the auto tensioner and the arm are arranged below the mount attaching portion, at a rear side relative to a front end of the mount attaching portion and in front of the chain cover; wherein the chain cover has a pair of side edge portions spaced from each other in a width direction thereof and a wall portion connecting the side edge portions, wherein the mount attaching portion is formed with an inclined surface connecting a lower part thereof with the wall portion, wherein the inclined surface is provided with a boss portion protruding forward, and wherein the auto tensioner is connected to the boss portion so that an upper end thereof is overlapped with the inclined surface as viewed from the front side of the engine.

* * * * *